United States Patent
Förster

(10) Patent No.: US 9,163,693 B2
(45) Date of Patent: Oct. 20, 2015

(54) ADJUSTABLE DAMPING VALVE FOR A VIBRATION DAMPER

(75) Inventor: Andreas Förster, Schweinfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 183 days.

(21) Appl. No.: 13/357,795

(22) Filed: Jan. 25, 2012

(65) Prior Publication Data

US 2012/0205567 A1    Aug. 16, 2012

(30) Foreign Application Priority Data

Feb. 10, 2011  (DE) .................... 10 2011 003 924

(51) Int. Cl.
| | | |
|---|---|---|
| F16F 9/34 | (2006.01) | |
| F16K 31/02 | (2006.01) | |
| F16F 9/46 | (2006.01) | |
| F16K 31/06 | (2006.01) | |
| F16F 15/00 | (2006.01) | |

(52) U.S. Cl.
CPC ............ *F16F 9/464* (2013.01); *F16K 31/0655* (2013.01); *F16K 31/0686* (2013.01); *F16F 15/005* (2013.01)

(58) Field of Classification Search
CPC .......... B60G 17/044; F16F 9/16; F16F 9/187; F16F 9/34; F16F 9/50; F16F 15/005
USPC ........... 188/322.13, 267, 313; 251/48, 50, 54, 251/129.07, 129.13, 129.15; 92/79; 60/453
See application file for complete search history.

(56) References Cited

U.S. PATENT DOCUMENTS

| | | | | |
|---|---|---|---|---|
| 5,078,240 A | * | 1/1992 | Ackermann et al. | 188/285 |
| 5,085,299 A | * | 2/1992 | Spiess et al. | 188/266.5 |
| 5,251,730 A | * | 10/1993 | Ackermann et al. | 188/315 |
| 5,791,318 A | * | 8/1998 | Schulz et al. | 123/520 |
| 5,921,281 A | * | 7/1999 | Takayama et al. | 137/625.65 |
| 6,234,462 B1 | * | 5/2001 | Beck et al. | 267/64.17 |
| 6,729,446 B2 | * | 5/2004 | Sakai et al. | 188/266.2 |
| 2007/0235669 A1 | * | 10/2007 | Suzuki et al. | 251/50 |
| 2008/0029939 A1 | * | 2/2008 | Beck et al. | 267/64.17 |
| 2008/0078634 A1 | * | 4/2008 | Heyn et al. | 188/266.5 |
| 2009/0020382 A1 | * | 1/2009 | Van Weelden et al. | 188/282.2 |
| 2011/0147147 A1 | | 6/2011 | Murakami | |

FOREIGN PATENT DOCUMENTS

| | | |
|---|---|---|
| DE | 10 2008 004 531 | 9/2009 |
| DE | 10 2008 040 643 | 3/2010 |
| DE | 10 2009 046 202 | 5/2011 |
| DE | 10 2009 059 808 | 6/2011 |
| DE | 10 2010 063 897 | 6/2011 |

* cited by examiner

*Primary Examiner* — Marina Tietjen
*Assistant Examiner* — Seth W MacKay-Smith
(74) *Attorney, Agent, or Firm* — Cozen O'Connor

(57) ABSTRACT

An adjustable damping valve device for a vibration damper includes an actuator which exerts an adjusting force on a valve body. The valve body has at least one surface acted upon by pressure of a damping medium as part of a pressure space. The surface acted upon by pressure causes an adjusting force on the valve body, and the pressure space is connected to a gas receiving space in the damping valve.

8 Claims, 3 Drawing Sheets

PRIOR ART

ADJUSTABLE DAMPING VALVE FOR A VIBRATION DAMPER

BACKGROUND OF THE INVENTION

1. Field of the Invention

The invention is directed to an adjustable damping valve which permits the degassing of the damping medium.

2. Description of the Related Art

In a vibration damper with hydraulic damping medium, it must be ensured as far as possible already during assembly that no air becomes trapped in the vibration damper. Air can become trapped due to the design of the structural component part. Gas can be dissolved in the hydraulic damping medium to a limited extent so that the damping medium consists of a hydraulic phase and a gaseous phase. If the volume fraction of the gaseous phase were constant, then the vibration damper could be designed for this boundary condition. However, the trapped air, which constitutes a purely gaseous phase, could be additionally dissolved in the damping medium. The damping medium is then made up of a liquid phase and a gaseous phase. Further, the purely gaseous phase can be entrained by the damping medium. Accordingly, the gaseous phase dissolved in the damping medium and the gaseous phase are distributed over the flow paths in the vibration damper. The dissolved gaseous phase can be separated from the damping medium due to a change in the temperature level and/or pressure level and then likewise presents a purely gaseous phase. The purely gaseous phase can collect in an area of the vibration damper as a bubble, or free gas as it is called hereinafter, and be present, e.g., at a functional surface which is acted upon by pressure as part of a functional space of the vibration damper. The gas present in the functional space alters the damping function. When the vibration damper is constructed based on the twin-tube principle, a piston rod guiding and sealing unit is often used so that gas which is trapped in the damping medium can escape from a work space into a compensation space via the piston rod seal.

Further, it is known to provide a degassing channel in an adjustable damping valve to produce a connection between an interior space of the adjustable damping valve and a work space. The cross section of the connection is small enough to allow degassing of the damping valve without any damping medium escaping. However, a connection of this kind is difficult to produce and to implement with respect to construction.

If possible, the adjustable damping valve is arranged in or at the vibration damper in such a way that any gas bubbles rise out of the damping valve and can escape into a work space. However, this particular installation position is not always possible, e.g., because a power supply line for an actuator of the adjustable damping valve calls for a particular installation position of the adjustable damping valve.

The trapped gas becomes noticeable particularly when the hydraulic pressure on a surface of a valve body is used to adjust the damping valve. The trapped gas leads to a certain compressibility of the damping medium and, therefore, to a change in the dynamic operating behavior of the adjustable damping valve. Although the desired hydraulic force components are achieved at the component parts of the valve which determine the damping force characteristic, the compressibility of the damping medium leads to an unwanted and undefined delay in the buildup of these force components. In terms of a static view of the error, a bogus adjusting force is briefly applied to this valve part.

It is thus an object of the present invention to overcome the problem associated with free gas known from the prior art.

SUMMARY OF THE INVENTION

According to the present invention, this object is met in that the pressure space is connected to a gas receiving space in the damping valve.

The advantage of the invention consists in that the free gas transported by the damping medium in the vibration damper is removed from the space adjoining the surface of the valve body acted upon by pressure. Consequently, the free gas cannot exert an undefined pressure force component on the valve body. The damping medium acts on the valve body with the proper pressure so that a defective functioning of the damping valve is prevented.

In a further advantageous embodiment of the invention, the gas receiving space is blocked by a blocking valve in the direction of flow to the pressure space. The gas stored in the gas receiving space can no longer escape from the gas receiving space in direction of the surface of the valve body acted upon by pressure regardless of the pressure level in the pressure space.

According to an advantageous embodiment, the actuator is constructed as a displacer of a pump device pumping in the direction of the pressure space. Therefore, removal of the gaseous phase depends not on thermosiphon effects, but on the operation of the actuator.

In this connection it is possible, e.g., for the damping medium to be supplied to the pressure space via a gap formed by the actuator. The advantage resides in the very simple construction.

Alternatively, a valve armature of the actuator can have at least one delivery channel which cooperates with a delivery valve opening in direction of the pressure space. Accordingly, a comparatively large delivery channel is available which results in a very good pumping rate.

According to an advantageous embodiment, the gas receiving space has a connection to a discharge flow channel. Therefore, the gas receiving space can not only receive the gas absorbed in the damping medium but can also release it in a directed manner. Accordingly, the storage volume of the gas receiving space can be kept comparatively small.

Further, the gas receiving space can have a blocking device which is open in the direction of flow to the discharge flow channel. This provides a flow connection to the gas receiving space which is directed solely through the arrangement of a valve device.

The discharge flow channel is advantageously connected to a flow-off cross section of the damping valve. The flow path intended for the damping medium is used to discharge trapped gas from the damping valve.

The gas receiving space is arranged inside the valve body to make optimal use of the available installation space.

With a view to producing the gas receiving space in the simplest possible manner, the valve body is formed by a tubular body.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings.

The invention will be explained in more detail with reference to the following description of the drawings in which.

DETAILED DESCRIPTION OF THE PRESENTLY PREFERRED EMBODIMENTS

Figure 1:
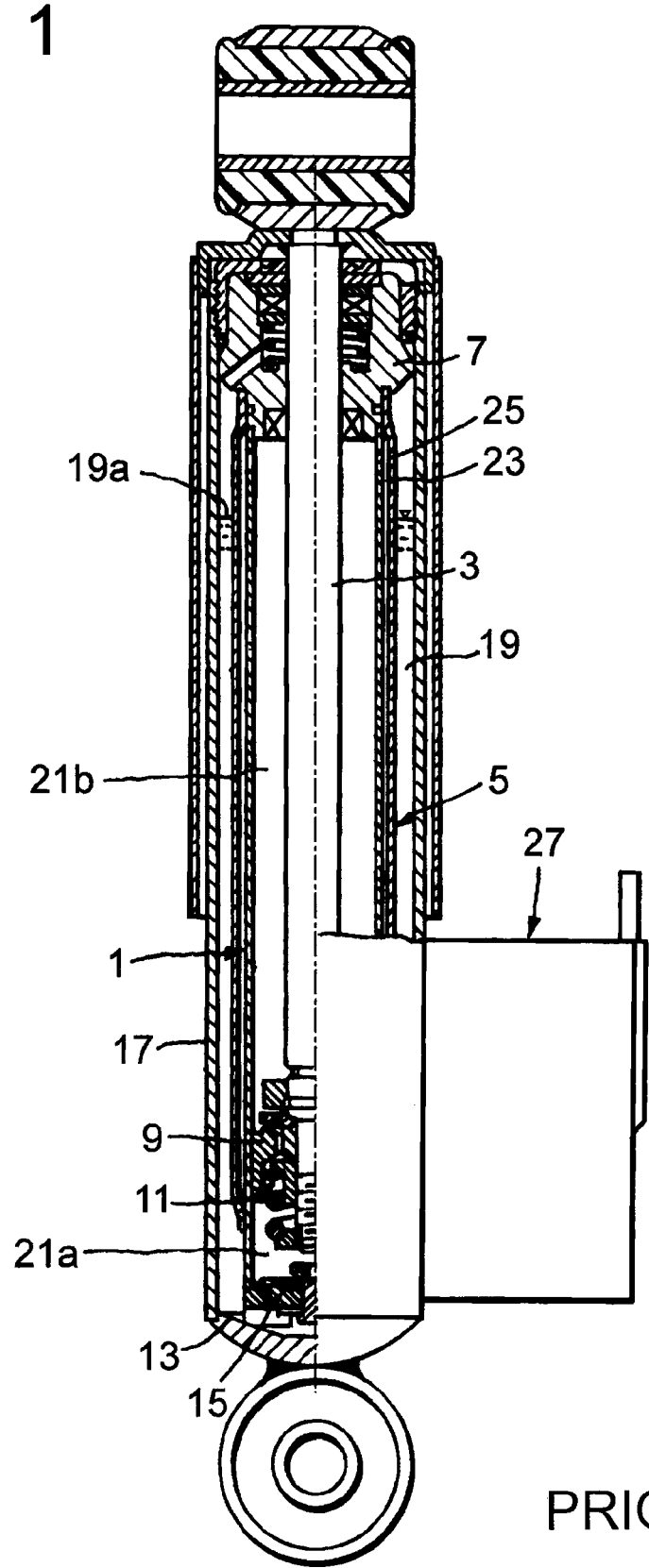
FIG. 1 shows a vibration damper with a damping valve device.

In FIG. 1, a vibration damper has a cylinder 1 in which a piston rod 3 is arranged so as to be axially movable. The piston rod 3 is guided out of the top end of the cylinder by a guiding and sealing unit 7. A piston unit 9 having a piston valve arrangement 11 is fastened to the piston rod 3 inside the cylinder 1. The bottom end of the cylinder 1 is closed by a base plate 13 having a bottom valve arrangement 15. The cylinder 1 is enclosed by a reservoir tube 17. The reservoir tube 17 and an intermediate tube 5 form an annular space 19 presenting a compensation chamber. The space inside the cylinder 1 is divided by the piston unit 9 into a first work chamber 21a and a second work chamber 21b. The work chambers 21a and 21b are filled with damping liquid. The compensation chamber 19 is filled with liquid up to level 19a and, above this, with gas. A first conduction path, namely a high-pressure section 23, is formed inside the compensation chamber 19 and communicates with the second work chamber 21b via a bore hole 25 of the cylinder 1. An adjustable damping valve device 27 which is fitted laterally to the reservoir tube 17 adjoins this high-pressure section. A second conduction path, namely a low-pressure section 29 (not shown), leads from the damping valve device 27 into the compensation chamber 19.

As the piston rod 3 moves upward out of the cylinder 1, the upper work chamber 21b decreases in size. A positive pressure builds up in the upper work chamber 21b and can only be dissipated through the piston valve arrangement 11 in the lower work chamber 21a as long as the adjustable damping valve 27 is closed. When the adjustable damping valve 27 is opened, liquid simultaneously flows from the upper work chamber 21b through the high-pressure section 23 and the adjustable damping valve 27 into the compensation chamber 19. Accordingly, the damping characteristic of the vibration damper when the piston rod 3 moves out depends on the degree to which the adjustable damping valve 27 is open or closed.

When the piston rod 3 moves into the cylinder 1, a positive pressure develops in the lower work chamber 21a. Liquid can pass from the lower work chamber 21a through the piston valve arrangement 11 upward into the upper work chamber 21b. The liquid which is displaced by the increasing piston rod volume inside the cylinder 1 is expelled through the bottom valve arrangement 15 into the compensation chamber 19. An increasing pressure likewise occurs in the upper work chamber 21b because the flow resistance of the piston valve arrangement 11 is less than the flow resistance of the bottom valve arrangement 15. This increasing pressure can flow into the compensation chamber 19 again through the high-pressure section 23 when the damping valve 27 is opened. This means that when the damping valve 27 is opened, the shock absorber has a softer characteristic when the adjustable damping valve 27 is opened and a harder characteristic when the damping valve 27 is closed when the piston rod moves in and also when it moves out. It should be noted that the flow direction through the high-pressure section 23 of the bypass is always the same regardless of whether the piston rod moves in or out.

Figure 2:
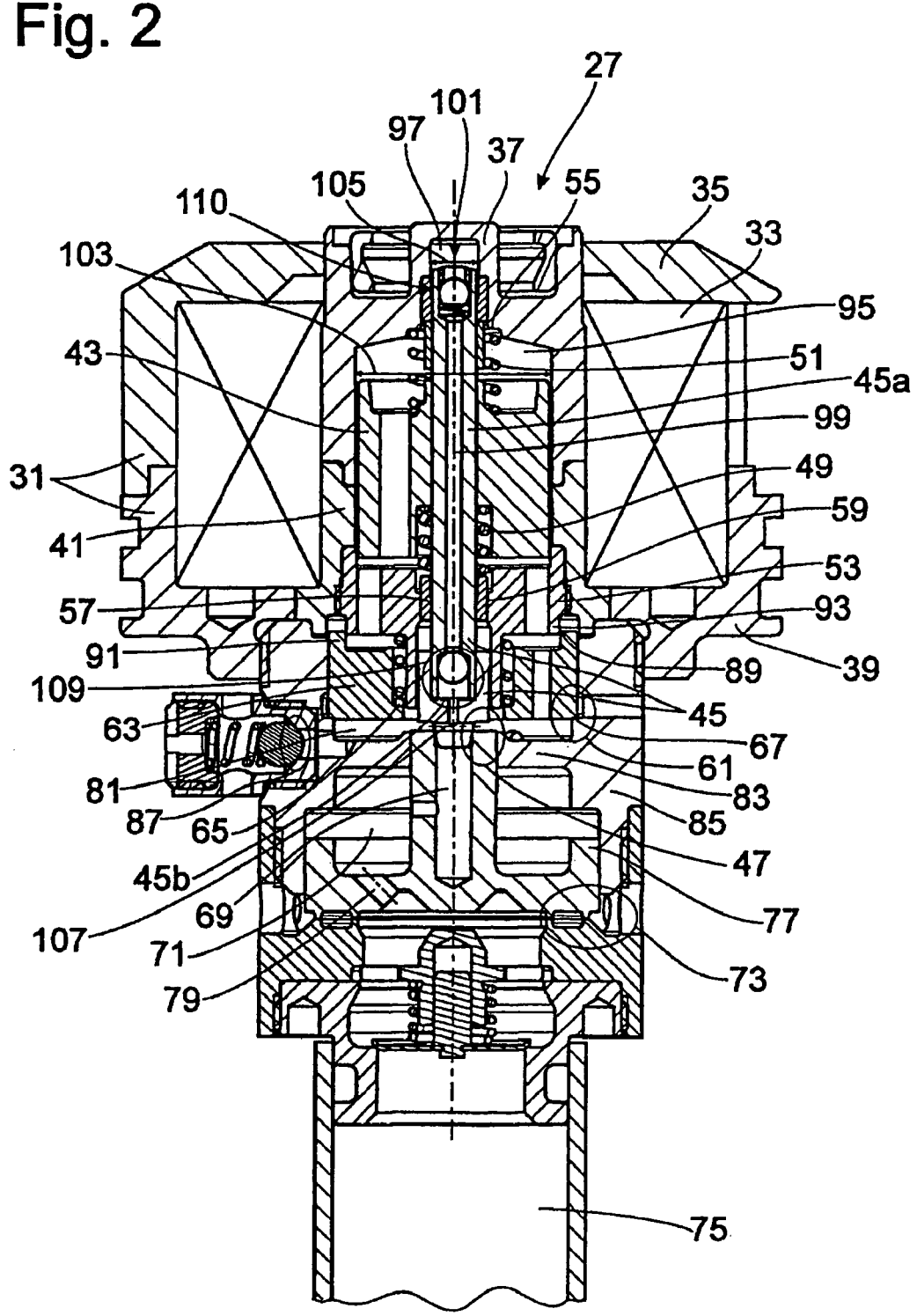
FIG. 2 is a detailed view of the damping valve device of the present invention.

FIG. 2 shows the damping valve device 27 in a housing 31 which is fastened externally to the reservoir tube 17 or inside the cylinder 1, e.g., to the piston rod 3. A ring-shaped magnetic coil 33 is arranged in the housing 31. An opening in a housing cover 35 is closed by a back-iron sleeve 37 having a base. An insulator 41 insulating against the magnetic flux of the magnetic coil 33 is arranged between a bottom housing part 39 and the back-iron sleeve 37.

Inside the back-iron sleeve 37, a valve armature 43 together with a valve body 45 of a first valve 47 floats axially against the force of a spring assembly which acts on both sides of the valve armature 43 and, therefore, also on both sides of the valve body 45. The spring assembly comprises at least one spring 49 per side which acts in opposition to the spring 51 on the other side of the valve armature 43. A magnetic flux guiding element 53 which has only a low magnetic flux resistance, i.e., has good magnetic conductivity, is fixed to the bottom housing part 39.

The valve body 45 of the first valve 47 is supported in the base of the back-iron sleeve 37 on one hand and in the magnetic flux guiding element 53 on the other hand. A first spring seat 55 for the at least one spring 51 is formed by the back-iron sleeve 37. A second spring seat 57 engages in a through-opening 59 of the magnetic flux guiding element 53; the valve body 45 of the first valve element 47 also extends through this through-opening 59. The second spring seat 57 is accessible via the through-opening 59 and forms an interference fit. This makes it possible for the second spring seat 57 to be axially displaceable within limits after the magnetic flux guiding element 53 has already been mounted so that the spring assembly 49; 51 can be retensioned. Possible manufacturing tolerances can be compensated by retensioning.

An emergency operation valve 61 is arranged in the housing 31 axially in series with the first valve 47; the magnetic flux guiding element 53 is arranged between the two valves 47; 61. A valve body 63 of the emergency operation valve 61 is constructed annularly and is arranged concentric to the valve body 45 of the first valve 47. A pre-loading spring 65 which is supported at the magnetic flux guiding element 53 tensions the valve body 63 of the emergency operation valve 61, which is constructed as a seat valve, on a valve seat surface 67 of the housing 85.

The valve body 45 of the first valve 47 is formed of multiple parts in its movement direction; at least two length portions 45a; 45b of the valve body 45 can execute an angular movement relative to one another. Length portion 45b is supported inside the through-opening 59 of the magnetic flux guiding element 53 so as to be angularly movable and is moved on the front side by the length portion 45a connected to the valve armature 43.

The second length portion 45b of the first valve 47 acts on a flow-off opening 69 of a control space 71 of a main stage valve 73 which is controlled by the first valve 47. The main valve 73 is connected to a work space 21a; 21b of the vibration damper by a connection piece 75. The damping medium exerts a lifting force on a main stage valve body 77 in opposition to a closing force of the first valve 47. Additionally, a pressure of the pressure medium in the control space 71, which is connected to the connection piece 75 via a connection opening 79 in the main stage valve 73, exerts a closing force on the main stage valve body 77. Depending on the force with which the first valve 47 holds the flow-out opening 69 of the main stage valve 73 closed, the main stage valve body 77 lifts up from its valve seat surface so that the damping medium can flow off radially via the valve seat into a compensation chamber 19 or a work space of the vibration damper.

The closing force of the first valve 47 is determined by, among others, the energization by means of the magnetic coil 33. High energization leads to a high closing force, and there is minimum closing force in the absence of current. Particularly when energization is very low, the damping medium can flow into an intermediate space 81 of the housing 31 which extends between a lower side of the magnetic flux guiding element 53 and an upper side of an intermediate wall 83 of the housing 85 to the main stage valve 73. The outflow from this intermediate space is determined by the emergency operation valve 61 and possibly by a pressure relief valve 87. In the de-energized state, the emergency operation valve 61 is held by the pre-loading spring 65 in a closed position on the valve seat surface 67. The first valve 47 and the emergency operation valve 61 are arranged in series with respect to the flow path of the damping medium proceeding from the connection piece 75.

Low energization results in a magnetic flux which proceeds radially from the bottom housing part 39 into the valve body 63 of the emergency operation valve 61. The resistance between an edge 89 of the valve body 63 and the magnetic flux guiding element 53 is lower than that between the valve seat surface 67 and the valve body 63 so that the magnetic flux exerts a lifting force on the valve body 63 in the direction of the magnetic flux guiding element 53. The magnetic flux proceeds via the length portion 45a of the valve body 45 of the first valve, which length portion 45a is located in the valve armature 43, to the valve armature and to the back-iron sleeve 37. The low current is not yet sufficient to significantly move the first valve body 45 of the first valve 47 in the direction of the flow-out opening 69. The air gap adjusted by the spring assembly 49, 51 between the valve armature 43 and the upper side of the magnetic flux guiding element 53 is not overcome until energization increases. When the emergency operation valve 61 is open, the magnetic resistance in the transition from the bottom housing part 39 along the valve body 63 of the emergency operation valve 61 to the magnetic flux guiding element 53 decreases again because the radial overlap between a circumferentially extending rib 91 of the valve body 63 of the emergency operation valve 61 and a shoulder 93 at the magnetic flux guiding element 53 increases with the lifting movement of the emergency operation valve 61.

In the absence of current in the magnetic coil 33 and when the emergency operation valve 61 is closed, the pressure relief valve 87 is available for allowing damping medium to flow out of the intermediate space 81 into a work space 21a; b or compensation space 19 and accordingly prevents an overloading of the entire vibration damper.

In addition to the magnetic force of the magnetic coil 33, a compressive force on the valve armature 43 and valve body 45 is also utilized. During operation of the damping valve device 27, damping medium arrives in pressure spaces 95; 97 inside the back-iron body 37 via a defined gap between the back-iron body 37 and the valve armature 43. Gas absorbed in the damping medium can be released therein. This flow movement of the damping medium is aided by the axial operating movement of the valve armature 43. The valve armature 43 assumes the function of a pumping device. The gas cushion resulting in the pressure spaces 95; 97 leads to an unwanted spring effect which can impair the functioning of the damping valve device 27 as a whole. To prevent this effect, the pressure space 97 is connected to a gas receiving space 99 inside the damping valve device 27.

In principle, the gas receiving space 99 could be a simple storage which is dimensioned for a definite gas volume. The gas receiving space 99 is arranged inside the valve body 45. To this end, the valve body 45 is formed by a tubular body. Therefore, compared to the prior art, the gas receiving space 99 does not require any additional installation space.

The gas receiving space 99 is blocked in the direction of flow to the pressure space 97 by a blocking valve 101. Consequently, the gas bubble located in the pressure space 95; 97 can escape into the gas receiving space 99 but can no longer flow back into the pressure space 95; 97. Accordingly, the unwanted gas cushion is permanently isolated from the surfaces 103; 105 acted upon by pressure.

In order to transfer the medium collected in the gas receiving space 99, the gas receiving space 99 has a connection to a discharge flow channel 107. Further, the gas receiving space 99 optionally has a blocking device 109 which is open in the direction of flow to the discharge flow channel 107. The blocking valve 101 and the blocking device 109 can be identically designed. The discharge flow channel 107 is connected to a flow-off cross section of the damping valve 47, in this case the intermediate space 81. The blocking device 109 prevents damping medium from penetrating into the gas receiving space 99.

During operation of the vibration damper, the valve body 45 is moved with the valve armature 43 at a comparatively high frequency by the excitation of the vibration damper or by means of the magnetic coil 33 so that both pressure spaces 95; 97 which are connected to one another by a defined gap 110 between the valve body 45 and the back-iron sleeve 37 are compressed. In so doing, the blocking valve 101 opens and the free gas is conveyed into the gas receiving space 99 as in a pump. As a result of the pumping function of the valve armature 43, a comparatively small armature stroke suffices to reliably discharge the gas bubble from the pressure spaces 95; 97.

The free gas in the gas receiving space 99 can escape into the flow-off channel 107 and further into the intermediate space 81 via the open blocking device 109. From the intermediate space 81, the gas bubble is entrained by the flow of damping medium at the valve 47 and is removed from the damping valve device 27 through the open emergency operation valve 61.

Depending on the construction principle of the vibration damper, the damping medium flows from the damping valve device 27 directly into the compensation space or into a work space and is guided onward to the compensation space via the piston rod guide. Trials and simulations have shown that owing to the design features in the adjustable damping valve and due to the distribution of damping medium, i.e., the delivery of damping medium with gaseous phase into the pressure space, the gas receiving space 99 is filled on one side and a blocking device 109 can be dispensed with, but the function of the pumping device is improved.

Figure 3:
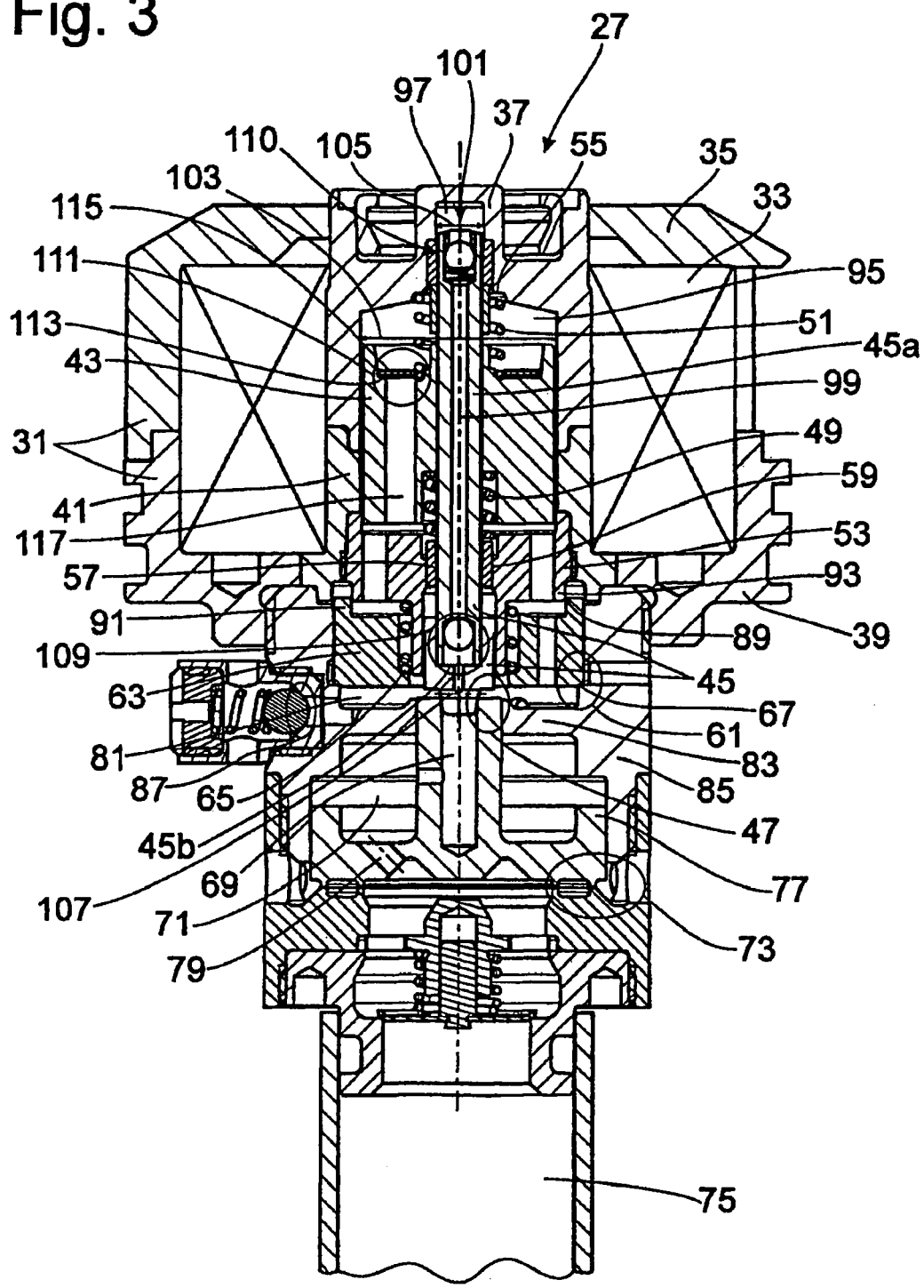
FIG. 3 is a cross-sectional view of a damping valve device of the present invention with a delivery valve at the valve armature.

FIG. 3 shows an embodiment example according to FIG. 2 having an additional delivery valve 111. The delivery valve 111 comprises a valve disk 115 which lifts off a valve seat surface 113 in the direction of the pressure space 95 and cooperates with at least one delivery channel 117 penetrating the valve armature 43 axially and can be preloaded in closing direction by spring 51, for example. In FIG. 2, the pressure space 97 in particular acts as a pump space and the gap 110 determines the delivery rate so that the pressure space 95 is now essentially the pump space having an appreciably greater diameter and, consequently, the pump volume per stroke of the valve armature 43a is appreciably larger. In this embodiment, the cross section of the gap 110 is appreciably less effective than in FIG. 2 and would also have larger dimensions in FIG. 3 than in FIG. 2. Not all three of the valves 101, 109, 111 carrying out the pumping function in FIG. 3 are required in principle. Depending on the pumping capacity required, the damping valve can be outfitted with one, two, or three valves 101, 109, 111 as is shown.

When the valve armature 43 moves in the direction of the magnetic flux guiding element 53, damping medium is displaced from a contiguous space limited on one side by the top of the intermediate wall 83 of the housing and by the bottom of the valve armature 43, via the at least one delivery channel 117 and the open delivery valve 111 into the pressure space 95. During a subsequent upward movement of the valve armature 43 in the direction of the pressure space 95, the pressure space 95 is compressed and damping medium is displaced into the gas receiving space 99. The optional blocking valve 101 is opened and the blocking device 109, which is likewise optional, is also opened. The emptying of the gas receiving space 99 takes place in the manner described with reference to FIG. 2.

The invention is not limited by the embodiments described above which are presented as examples only but can be modified in various ways within the scope of protection defined by the appended patent claims.

I claim:

1. An adjustable damping valve device for a vibration damper comprising:
   a valve body (45) having at least one pressure surface acted upon by a pressurized damping medium;
   an actuator including a magnetic coil (33) and a movable valve armature (43) for exerting an adjusting force on said valve body (45); said valve body (45) carried by and extending through said moveable valve armature (43); a free gas receiving space (99) defined within said valve body (45);
   a pressure space (95; 97) defined by said pressure surface of said valve body (45); said pressure space (95, 97) being connected to said gas receiving space (99); and
   a blocking valve (101) disposed above said movable valve armature (43) between said pressure space and said free gas receiving space (99) for blocking the flow of said free gas from said free gas receiving space (99) in the direction of said pressure space (95, 97).

2. The adjustable damping valve device of claim 1, additionally comprising a back-iron sleeve (37) defining a gap between said back-iron sleeve and said armature for supplying damping medium to said pressure space (97).

3. The adjustable damping valve device of claim 2, wherein said valve armature comprises at least one delivery channel (117) in communication with said pressure space (95, 97); and a delivery valve cooperating with said delivery channel (117) in the direction of said pressure space (95; 97).

4. The adjustable damping valve device of claim 1, additionally comprising a discharge flow channel (107) connected to said gas receiving space (99).

5. The adjustable damping valve device of claim 4, wherein said free gas receiving space (99) additionally comprises a blocking device (109) open in the direction of flow to said discharge flow channel (107).

6. The adjustable damping valve device of claim 4, additionally comprising a flow-off cross section connected to said discharge flow channel (107).

7. The adjustable damping valve of claim 1, wherein said free gas receiving space (99) is arranged inside said valve body (45).

8. The adjustable damping valve device of claim 1, wherein said valve body (45) is constructed as a tubular body.

* * * * *